INVENTORS.
AUGUST F. MANZ
HERBERT B. SARGENT

BY
ATTORNEY

Oct. 31, 1967   A. F. MANZ ETAL   3,350,539
METHOD FOR ELIMINATING WELD PUDDLE CRACKING
Filed Oct. 5, 1965   2 Sheets-Sheet 2

INVENTORS
AUGUST F. MANZ
HERBERT B. SARGENT
BY
ATTORNEY

United States Patent Office 3,350,539
Patented Oct. 31, 1967

3,350,539
METHOD FOR ELIMINATING WELD PUDDLE CRACKING
August F. Manz, Union, N.J., and Herbert B. Sargent, Indianapolis, Ind., assignors to Union Carbide Corporation, a corporation of New York
Filed Oct. 5, 1965, Ser. No. 493,169
17 Claims. (Cl. 219—137)

This invention relates to consumable wire electrode welding and, more particularly, to a process for depositing metal from such electrode wherein the tendency for the deposited weld metal to develop cracks as it freezes is minimized.

In the welding industry, the occurrence of cracks in the weld metal, as such metal solidifies, has long been a problem. Cracking is especially a problem where the pieces to be welded must necessarily be held in fixturing devices which place such pieces under a severe restraint. Fixturing of workpieces, of course, is routine in the welding of thick plates as would be required in the manufacture of ships, heavy vessels, and industrial applications. Accordingly, the occurrence of cracks in the welding of such thick plates has been a critical problem. The problem has been complicated further by the desire in the industry to achieve a simple economical process for butt-welding plates having a thickness of greater than ½ in. with a comparatively narrow groove spacing between the faces of the plates to be welded. A narrow groove joint is defined for purposes of this disclosure as a joint wherein the ratio of the width of the groove between the faces of the plates to the plate thickness is from about ⅓ to about ⅟₁₆.

The advantages of a commercially successful narrow groove process are almost self-evident. Such a process could eliminate the need for V or U joint designs which require excessive amounts of weld metal and time to deposit such weld metal. The prior art V and U joint designs promote warpage and distortion of the plates and increases the tendency for the weld metal to crack.

There have been attempts to make narrow groove welds in the past. However, all such attempts have been hampered by what are severe practical limitations. One such limitation is the tendency for spurious arcing to occur between the consumable electrode being fed down into the narrow groove and the side walls of the narrow groove. To overcome this problem the wire must be fed extremely straight so that the wire does not touch the walls. This is very difficult to achieve practically, especially with fine wires such as 0.045 in. diameter and smaller.

Accordingly, it is an object of our invention to provide a process for making crack-free welds in relatively thick plate having a narrow groove spacing with at least one consumable electrode welding wire which does not have to be insulated from the side walls of the groove as such wire is fed to the bottom of the groove.

A broader object of the invention is to provide a method for making crack-free welds with a consumable electrode metal arc welding process.

The objects of the invention are accomplished in a general way by a method of consumable metal electrode arc working wherein an arc is energized between the end of the consumable metal electrode and a workpiece. The power supplied to the arc is alternately changed between a first value and a second value while metal from the electrode is deposited on the workpiece. The frequency of alternation of such power is maintained such as to permit the arc to adjust its length in response to the power change. Alternately changing the arc power produces a change in the weld metal freeze pattern, thereby eliminating the tendency for such metal weld to crack.

This invention is based on the realization that in order to eliminate weld cracking, a method had to be developed which altered the freeze pattern of the weld metal which formed the joint between the pieces to be joined. It was discovered that alternately changing the power to the arc existing at the end of a consumable electrode did beneficially alter the freeze pattern of the weld metal and, thus, eliminate weld cracking. The change in power supplied to the arc may be achieved in any of several ways, as for example, changing the rate at which the consumable metal electrode is fed toward the work; changing the power supplied to the arc from a welding power supply or by a combination of these procedures. At present it is preferred to change the power supplied to the arc by alternately changing the power output of an electric welding power supply.

The alternate change in the power output from a welding power supply may also be achieved by several methods, such as magnetic amplifier circuits, etc. The presently preferred embodiment will be described in referring to the drawings.

An important criteria in determining how to practice the present invention is the frequency of the alternation of the power. If the changes in the power from a first value to a second value are too rapid, there is no perceptible change in the arc length and, thus, no change in the freeze pattern. On the other hand, if the alternations are too slow, the change in freeze pattern will not occur fast enough so that there will be regions in the weld where the freeze pattern is unaltered. The frequency of the alternations should be such to permit the arc to adjust its length in response to the power change. Thus, for example, in the preferred embodiment the power is alternately changed from a condition which produces metal transfer from the end of the consumable electrode only during short-circuiting transfer of such electrode to the work, hereinafter referred to as short arc, to a condition which produces non-short-circuiting metal transfer in the form of a spray of droplets of globules of metal across the arc. For the purpose of this disclosure the spray or globular transfer will be referred to as globular transfer even though there is some distinction made between spray and globular transfer by some experts. If the alternations of the power supplied to the arc are not of a frequency which will permit the transfer to change from short arc to globular in the preferred embodiment described here, there would not be any beneficial effect on the freeze pattern and the results of the invention would not be obtained.

It is also possible to achieve the results of the invention, for example, by changing from a first value of power for globular transfer to a second value of power for globular transfer. Again the main criteria for determining frequency is that the arc have an opportunity to adjust to the new power conditions so that it may have the beneficial effect required on the weld puddle freeze pattern.

Having discussed the invention in general terms, reference should now be made to the drawings from a more particular description of the invention.

Figure 1:
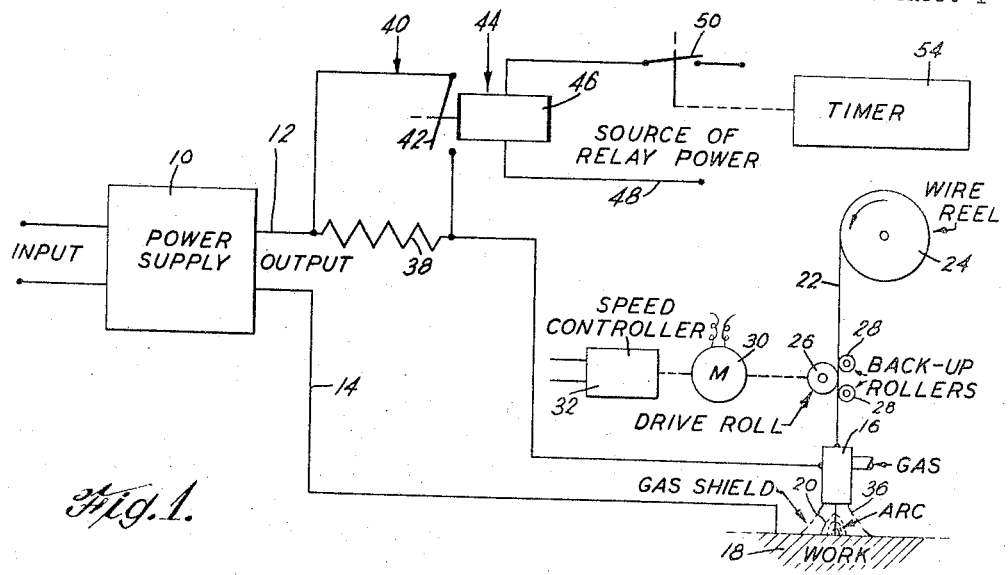
FIGURE 1 is a circuit diagram of a typical circuit for carrying out the process of the invention.

FIGURE 1 shows a typical system for practicing the present invention which is presently the preferred embodiment of the invention. In such figure, the output of a welding power supply 10 is connected by conductors 12 and 14 across a welding torch 16 and workpiece 18. A consumable wire electrode 22 which may be typically a bare metal electrode or a tubular flux filled electrode is fed continuously from a reel 24 of such wire by a drive roll 26, in cooperation with back-up rolls 28, through the torch 16 toward the welding zone 20. Drive roll 26 is driven by a motor 30 provided with a speed controller 32 such as an electronic governor. Suitable shielding gas such as argon, helium or mixtures of such gases with oxygen and carbon dioxide and preferably a gas mixture of 75% argon, 25% carbon dioxide is fed through the torch 16 and is discharged as a continuous stream 36 from the end of the torch 16.

A resistor 38 is connected in series with conductor 12 between the power supply 10 and torch 16. Such resistor 38 is provided with a shunt circuit 40 including a normally open contact 42 of a relay 44 the coil 46 of which is connected to a source of power by a circuit 48 including a switch 50 and a timer 54.

Figure 2:
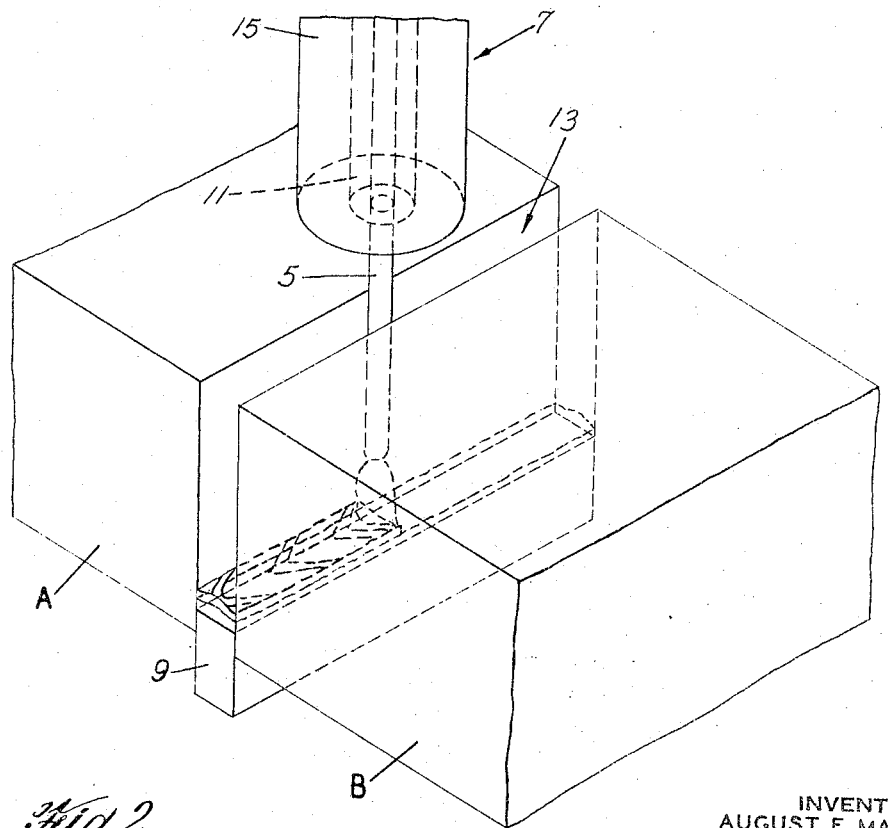
FIGURE 2 is a diagrammatic sketch illustrating a typical relationship of welding torch to work for carrying out the invention in making narrow groove welds.

FIGURE 2 shows a typical relationship of a torch such as torch 16 in FIGURE 1 to the work to be welded for the welding of a narrow groove. Pieces A and B to be welded are brought together in abutting relationship so as to form a narrow groove 13 which is typically ¼ inch. A back plate 9 is tack welded to the bottom of the plates A and B. A consumable wire electrode 5 is supplied through a torch 7 and is fed from outside the groove 13 down thereinto. Shielding gas is fed into the groove through the torch 7 usually through passages provided between the contact tube 11 and outer body 15 of the torch 7.

In actual operation, after the back plate 9 has been tack welded in place to pieces A and B to form the narrow groove as shown in FIGURE 2, the torch 7 is positioned above the work. Accordingly, the electrode extension is somewhat greater than the thickness of the pieces to be welded. Electrode extension is defined as the distance from the area where the electrode emerges from the guide tube 11 to the weld puddle. Typical length for the initial wire extension in the preferred practice of this invention is about 3¼ inches for the conditions set forth in the hereinafter appended examples. Once the arc is initiated between the wire 5 and bottom of the narrow groove 13, timer 54 is activated to program or control the operation of switch 50. With switch 50 open, relay switch 42 is open, resistor 38 is in the circuit to the arc and the arc receives a first value of power which in the preferred embodiment is such as to provide a short-circuiting of the electrode to work during which metal is transferred from such electrode to the work (short-arc transfer). When the switch 50 is closed, relay coil 46 is energized closing switch 42, which effectively removes resistor 38 from the circuit. This has the effect of changing the first value of power to a second value which in this case is a higher value so that the mode of metal transfer is of the globular type. Preferably, it has been found that the timer should be set so that it opens and closes the circuit 48 between 50 and 100 times a minute.

Similarly the wire feed speed may be changed by operation of the speed controller 32 to alternate the arc power between first and second value. Also the timer and speed controller may be operated in unison to achieve the change in arc power.

The practice of the invention has many advantages especially in narrow groove welding. It has been found that it is possible according to the invention to have relatively long wire extensions which means that the wire electrode may be fed from above the groove down thereinto without the aid of a guide tube down in the groove. Also, it has been found that the wire electrode can brush past pieces of spatter that have lodged on the walls of the groove without deleterious effects on the process. On such occasions there will commonly be a small flash or momentary arc between the wire electrode and the spatter but this flash does not grow into a self-sustaining arc or melt the wire electrode off. The wire should, however, be fed as straight as possible so as to avoid continuous firm contact between the wire and the walls of the groove. With this limitation in mind, it has been found that ¼ inch and ⅜ inch grooves are preferred with 3/32 inch diameter wires.

Having thus set forth our invention in both general and specific terms, the following examples are appended hereto to provide those skilled in the art with illustrative conditions for practicing the invention and to provide an indication of how the concepts of this invention may be extended to situations where such skilled artisans may find a need for the invention.

EXAMPLE I

Arrangement of equipment and circuitry were essentially as shown in FIGURES 1 and 2. Two inch thick carbon steel plates were positioned with a ¼ inch groove between their faces. The torch was positioned above the groove so that the wire extension was approximately 3¼ inches. The power supply was a constant potential type power supply having some inductance in the D.C. circuit thereof. The electrode was 3/32 inch diameter wire having approximately the following composition: carbon 0.03 weight percent, manganese 1.75, silicon 0.30, nickel 1.65, molybdenum 0.30, chromium 0.10, sulfur and phosphorous 0.005, titanium, aluminum and zirconium 0.01 each, balance iron. The wire feed speed was 190 inches per minute. The travel speed of the torch relative to the work was 27 inches per minute. An arc was initiated from the end of the consumable wire to the work. The timer was set to operate the relay coil 90 times a minute. The timer and contacts 50 were adjusted so that the resistor was in the circuit for 75% of the time during which period the metal transfer was short arc and out of the circuit 25% of the time during which period the metal transfer was globular. The shielding gas was 75% argon and 25% $CO_2$ at 60 c.f.h. The two inch deep groove was filled in 8 passes. The ammeter and voltmeter readings for each pass were:

| Pass | Amps | Volts | Remarks |
| --- | --- | --- | --- |
| 1 | 400–440 | 27–29 | |
| 2 | 400–440 | 27–29 | |
| 3 | 420–450 | 26–28.5 | |
| 4 | 430–470 | 26–28.5 | |
| 5 | 440–480 | 26–28.5 | |
| 6 | 400–440 | 27–29 | Torch raised 1″. |
| 7 | 420–460 | 27–29 | |
| 8 | 430–450 | 26–28.5 | |

Figure 4:
FIGURE 4 is a photomicrograph of a weld made according to the present invention.

Oscillograph readings were taken also. These showed that the current actually varied from 400 to about 500 amps. and the voltage varied from 26 to about 32 volts as the relay alternately added and removed the resistor from the circuit. The weld obtained was a crack-free weld as shown in FIGURE 4.

Figure 3:
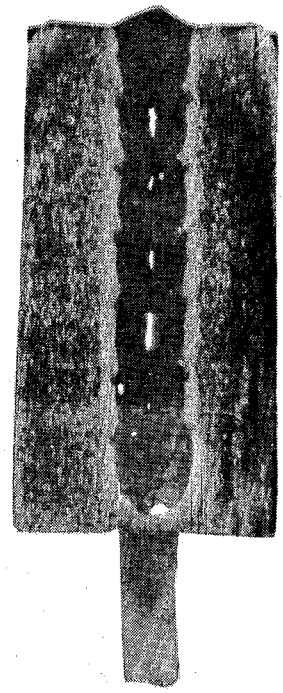
FIGURE 3 is a photomicrograph of a weld made without utilizing the present invention.

The same weld made without the use of the alternating power of the invention is shown in FIGURE 3. It can be clearly seen that the weld in FIGURE 3 has a center line cracking which makes it completely unacceptable for critical applications such as submarine hulls.

EXAMPLE II

The arrangement of equipment used was essentially as shown in FIGURES 1 and 2. Two 2-inch thick carbon steel plates were positioned with a ⅜ inch groove between their faces. The torch was positioned above the groove so that the wire extension was approximately 4 inches. The power supply was the same type as the one used in Example I. The consumable electrode was a 3/32 inch diameter wire having approximately the following composition: carbon .04 weight percent, manganese 1.2, phosphorous .016, sulfur .020, silicon .5, aluminum .10, zirconium .07, titanium .10, balance iron. Wire feed speed was 240 i.p.m. Travel speed was 20 i.p.m. The timer was set to energize the relay coil 90 times a minute. The timer and contacts 50 were adjusted so that the resistor was in the circuit about 67% of the time during which time the metal transfer was short arc and out of the circuit 33% of the time during which time the metal transfer was globular. The shielding gas was argon with 5% oxygen added and the gas flow was 60 c.f.h.

The two-inch thick groove was filled in 8 passes. The ammeter and voltmeter readings for each pass were:

| Pass | Amps | Volts | Remarks |
|---|---|---|---|
| 1 | 460–520 | 27–30 | |
| 2 | 460–520 | 27–30 | |
| 3 | 480–540 | 26–28 | |
| 4 | 500–560 | 26–28 | |
| 5 | 510–580 | 25–27 | |
| 6 | 480–540 | 26–28.5 | Torch raised ¾". |
| 7 | 500–560 | 26–28 | |
| 8 | 510–570 | 26–28 | |

Oscillograph readings showed the actual swing in current was again about 100 amps., that is the current ranged between 460–560 amps. as the resistor was added and then removed from the circuit. Likewise the voltage swing was about 6 volts, that is the voltage ranged between about 25 to about 31 volts.

While the above invention was described with reference to certain embodiments, it is understood that many different techniques may be devised by skilled artisans in the performance of the invention without departing from the spirit and scope thereof. For example, more than one wire electrode may be used in the practice of the invention.

What is claimed is:

1. Method of consumable metal electrode arc working which comprises energizing an arc between the end of said consumable electrode and a workpiece; alternately changing the power supplied to the arc between a first value and a second value while depositing metal from the end of said consumable electrode to said workpiece at a frequency of alternation below 5 cycles per second to cause the arc to vary in length in response to the power change; the alternate change in arc power producing a change in the weld metal freeze pattern thereby eliminating the tendency for such weld metal to crack.

2. Method according to claim 1 wherein the alternate changes in the power supplied to the arc are accomplished by repeatedly changing the power supplied to the arc from a welding power supply.

3. Method according to claim 1 wherein the alternate changes in the power supplied to the arc are accomplished by alternately increasing and decreasing the impedance in the circuit including said arc.

4. Method according to claim 1 further comprising: adjusting the length of the arc by repeatedly changing the rate at which the consumable metal electrode is fed to the arc such that the power supplied to the arc is alternately changed at a frequency of alternation below 5 cycles per second.

5. Method according to claim 1 wherein the alternate changes in the power supplied to the arc are accomplished by repeatedly changing the power supplied to the arc from a welding power supply and by simultaneously changing the rate at which the consumable metal electrode is continuously fed toward the work.

6. Method according to claim 1 wherein the alternate changes in the power supplied to the arc are such that the mode of metal transfer from the end of said consumable electrode alternates between short-circuit metal transfer and globular transfer.

7. A method for making a weld in metal wherein the ratio of the width of the groove between the pieces to be joined and the thickness of such pieces is in the range of about ⅓ to about 1/16 which comprises feeding consumable electrode from outside said groove thereinto; energizing an arc between the end of said consumable electrode and the pieces to be joined; alternately changing the power supplied to the arc between selected values that are different from each other while depositing metal from the end of said consumable electrode at a frequency of alternation low enough to cause the arc to vary in length in response to the power change, the alternate change in the power producing a change in the weld metal freeze pattern thereby eliminating the tendency for such weld metal to crack.

8. A method according to claim 7 wherein the alternate changes in the power supplied to the arc are accomplished by repeatedly changing the power supplied to the arc from a welding power supply.

9. A method according to claim 7 wherein the alternate changes in the power supplied to the arc are accomplished by alternately increasing and decreasing the impedance in the circuit including said arc.

10. A method according to claim 7 further comprising: adjusting the length of the arc by repeatedly changing the rate at which the consumable metal electrode is fed to the arc such that the power supplied to the arc is alternately changed at a frequency of alternation below 5 cycles per second.

11. Method acccording to claim 7 wherein the alternate changes in the power supplied to the arc are accomplished by repeatedly changing the power supplied to the arc from a welding power supply and by simultaneously changing the rate at which the consumable metal electrode is continuously fed toward the work.

12. Method according to claim 7 wherein the alternate changes in the power supplied to the arc are such that the mode of metal transfer from the end of said consumable electrode alternates between short circuiting metal transfer and globular transfer.

13. A method according to claim 7 wherein the pieces to be joined are from about ½ to about 4 in. thick carbon steel with a groove of from about ¼ to about ⅜ in., the electrode has approximately the following composition expressed in weight percent: 0.03 carbon; 1.75 manganese; 0.30 silicon; 1.65 nickel; 0.30 molybdenum; 0.10 chromium; 0.005 sulfur and phosphorous; 0.01 each of titanium, aluminum, zirconium and balance iron; and the arc is shielded by a gas.

14. Method according to claim 13 wherein the shielding gas is composed of 75 percent argon and 25 percent $CO_2$.

15. Method according to claim 13 wherein the electrode is 3/32 in. in diameter.

16. Method according to claim 15 wherein the alternate changes in the power supplied to the arc are such that the mode of metal transfer from the end of said consumable electrode alternates between short circuiting metal transfer and globular transfer.

17. Method according to claim 16 wherein the time that the mode of metal transfer is of the short circuiting type is at least greater than 50 percent.

References Cited

UNITED STATES PATENTS

| | | | |
|---|---|---|---|
| 1,278,984 | 9/1918 | Morton | 219—124 |
| 2,139,160 | 12/1938 | Hebeler | 219—135 X |
| 3,053,975 | 9/1962 | Nelson et al. | 219—130 |
| 3,249,735 | 5/1966 | Needham | 219—131 |

RICHARD M. WOOD, *Primary Examiner.*